United States Patent
Hughes et al.

(10) Patent No.: US 6,712,564 B1
(45) Date of Patent: Mar. 30, 2004

(54) TOOL WITH IMPROVED RESISTANCE TO DISPLACEMENT

(75) Inventors: Donald R. Hughes, Meadville, PA (US); James M. Greenleaf, Meadville, PA (US); Stanley B. Howles, Saegertown, PA (US)

(73) Assignee: Greenleaf Technology Corporation, Coronado, CA (US)

( * ) Notice: Subject to any disclaimer, the term of this patent is extended or adjusted under 35 U.S.C. 154(b) by 0 days.

(21) Appl. No.: 09/675,633

(22) Filed: Sep. 29, 2000

(51) Int. Cl.[7] .......................... B23B 27/14; B23P 15/30
(52) U.S. Cl. ................................ 407/119; 407/120
(58) Field of Search ................ 407/118, 119, 407/110, 113, 114, 115, 116, 117, 120, 47, 103, 107

(56) References Cited

U.S. PATENT DOCUMENTS

| | | | |
|---|---|---|---|
| 2,453,959 A | * 11/1948 | Anthony et al. | 407/96 |
| 4,252,038 A | * 2/1981 | Subramanian et al. | 82/1.11 |
| 4,448,591 A | * 5/1984 | Ohno | 51/298 |
| 4,477,212 A | 10/1984 | Kraft | |
| 4,480,950 A | 11/1984 | Kraft et al. | |
| 4,539,875 A | 9/1985 | Lee et al. | |
| 4,629,373 A | * 12/1986 | Hall | 175/434 |
| 4,997,049 A | * 3/1991 | Tank et al. | 175/430 |
| D363,727 S | 10/1995 | DeRoche | |
| 5,722,803 A | * 3/1998 | Battaglia et al. | 407/115 |
| 5,820,311 A | 10/1998 | Grün et al. | |
| 6,042,886 A | * 3/2000 | Matthee et al. | 407/119 |
| 6,261,032 B1 | * 7/2001 | Duwe et al. | 407/107 |
| 6,287,682 B1 | * 9/2001 | Grab et al. | 407/119 |
| 6,334,742 B1 | * 1/2002 | Shiraiwa | 407/110 |

FOREIGN PATENT DOCUMENTS

| | | | |
|---|---|---|---|
| EP | 0019461 A1 | * 11/1980 | |
| EP | 0143569 A1 | * 6/1985 | |
| EP | 1 016 479 A2 | 5/2000 | |
| GB | 929691 | 6/1963 | |

OTHER PUBLICATIONS

Michael Field et al., Surface Finish and Surface Integrity, ASM Handbook (9th ed.), vol. 16, pp. 19–36.
J.T. Black, Introduction To The Machining Process, ASM Handbook (9th ed.), vol. 16, pp. 1–18.

* cited by examiner

Primary Examiner—Henry W. H. Tsai
(74) Attorney, Agent, or Firm—Kirkpatrick & Lockhart LLP

(57) ABSTRACT

A method of treating a tool includes texturing at least a region of at least one surface of the tool to increase surface roughness and friction resistance. The tool may be in a variety of forms such as a cutting tool insert. The texturing process may be carried out by any suitable method such as laser beam impacting, grinding, sandblasting, molding, chemical etching, photolithography, and/or reactive ion etching. Tools made by the method also are disclosed.

57 Claims, 8 Drawing Sheets

Roughness average $R_a$

Roughness average $R_a$, AA, or CLA is $$R_a = \frac{1}{L} \int_{X=0}^{X=L} |Y| dx,$$

where $L$ is the sampling length and $Y$ is the ordinate of the profile from the centerline.

TOOL WITH IMPROVED RESISTANCE TO DISPLACEMENT

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. Field of the Invention

The present invention is directed to tools and methods of producing and treating them. More particularly, the present invention is directed to tools that are treated by modifying at least a region on at least one surface of the tool by texturing the region in order to, for example, improve the retention capability of the tool in a tool holder. The tool may be, for example, a cutting tool insert or a chip breaker. The present invention also relates to methods of producing or treating a tool. Thus, the methods of the present invention may be applied in the production or treatment of cutting tools, and a particular application of the present methods is in the production of cutting tool inserts and/or chip breakers used in the machining of metals and other materials.

2. Description of the Invention Background

Castings, forgings, or other metal-containing preforms often are subjected to machining so as to convert the preform into a final product of the desired shape, size and/or finish. Machining is generally defined as the process of removing unwanted material from a workpiece. In a common form of a machining process known as chip machining, a surface of a cutting tool is brought into forceful contact with a workpiece and separates material from the workpiece in the form of small chips. The cutting tool may include a tool holder having a shank that can be mounted on a machine tool. A cutting tool insert formed of a high strength, high hardness material is removably secured on the tool holder, and the cutting tool insert can be replaced once worn. During the machining process, it is important that the cutting tool insert be securely seated and retained in a fixed position within the tool holder. Even slight movement of the cutting tool insert during the machining process can result in failure of the insert or production of material that is outside the desired tolerance specifications. Most manufactured products contain one or more components manufactured by machining, and often the machining step or steps produce the components to very precise tolerances. Machining, while one of the most basic and important processes used in manufacturing metal products, also is one of the more expensive. Thus, even modest improvements in the machining process may yield substantial cost savings.

There are a number of basic chip machining processes, including turning, boring, shaping, milling, drilling, sawing, and broaching. In one such process, turning, external surfaces of revolution may be generated by the action of a cutting tool insert on a rotating workpiece. Typically, the workpiece is mounted and rotated on a lathe. In turning, as in each of the other chip machining processes, the design of the cutting tool is critical to the efficiency by which material can be removed from the workpiece. Thus, substantial sums are spent each year to research and develop improved cutting tools for machining.

Cutting tool materials predominantly in use for production machining processes include high speed steels, carbides, cemented carbides (such as, for example, cemented tungsten carbide), cermets (carbide/ceramic), CBN (cubic boron nitride), PCD (polycrystalline diamond), and ceramics. Ceramics are preferred materials that are used commonly in cutting tool inserts used in turning operations. They are also one of the most recently developed classes of materials. Ceramics are particularly advantageous materials because they generally have high hardness, are relatively resistant to oxidation and, therefore, exhibit low tool wear at high cutting temperatures. The faster the cutting speeds, the higher the cutting temperature. Thus, the hardness, oxidation and wear resistance properties of ceramics allow ceramic cutting tools to be used with fast cutting speeds while maintaining long tool life, thereby improving the efficiency of the machining process.

Current ceramic materials used to produce cutting tool inserts are commonly based on either alumina ($Al_2O_3$) or silicon nitride ($Si_3N_4$). The production of ceramic articles generally, and ceramic cutting tool inserts in particular, involves the consolidation and sintering of powdered material. There are two basic methods of producing ceramic articles, cold pressing and hot pressing. In cold pressing, the powdered material is first consolidated, or pressed, into a green (unsintered) body. The green body is then sintered by heating the body to a high temperature below the melting point of the powdered material. The body is maintained at the high temperature for a time sufficient to fuse the powder particles and sufficiently densify the green body. In hot pressing, the powdered material is heated in a die while a high uniaxial pressure is applied to the body. Hot pressed ceramic usually has a finer grain size and higher density than cold pressed ceramic, thereby resulting in superior hardness and longer tool life.

Although ceramic cutting tool inserts made from hot pressed ceramic have properties superior to those made from cold pressed ceramic, cold pressed ceramic inserts are commonly used. One reason for the continued use of cold pressed ceramic cutting tool inserts is that forming ceramic by cold pressing arguably provides a greater degree of flexibility in designing the exterior contour of the inserts.

Some means is necessary to retain the cutting tool insert on the tool holder. Historically, cutting tool inserts formed by hot or cold pressing were designed with a bore therethrough, as shown in FIG. 4(a). In this design, the cutting tool insert 130 is secured in the pocket 126 of the tool holder 120 by inserting and threadedly securing a locking pin 150 through the bore 132 and into a bore 124 in the tool holder 120. Because a large volume of material is removed from a central region of the cutting tool insert 130 to provide bore 132, the strength of the insert may be reduced.

In an alternative design, the cutting tool insert is retained on the tool holder by a clamp. An example of this design is shown in FIG. 4(b). A generally L-shaped clamp 240 secures the cutting tool insert 230 to the tool holder 120. One leg 246 of the L-shaped clamp 240 is secured within bore 122 of the tool holder 120, while the other leg 248 is disposed against an exposed flat face 232 of the cutting tool insert 230. Cutting tool inserts composed of either hot or cold pressed ceramic may be used in this cutting tool design. Because the cutting tool insert 230 of FIG. 4(b) lacks a central bore, the strength of the insert is not compromised. On the other hand, the insert 230 of the design of FIG. 4(b) is not, in general, secured to its tool holder as strongly as the insert 130 of FIG. 4(a).

Another prior art cutting tool design is shown in FIG. 4(c). Here, the cutting tool insert 330 includes a depression 332 in at least one surface 334. One leg 346 of a generally L-shaped clamp 340 is secured within bore 122 of the tool holder 120 while the other clamp leg 348 is seated in the depression 332. As will be apparent to those skilled in the art, there are many different conventional designs of L-shaped clamp 340. This arrangement more positively secures the insert 330 in the pocket 126 of the tool holder 120 relative to the arrangement of FIG. 4(b). Hot pressing cannot be economically applied readily to produce cutting tool inserts having a depression as shown in FIG. 4(c).

Accordingly, there exists a need for an improved arrangement for securely retaining cutting tool inserts on tool holders. Preferably, the improved retention arrangement may be used with both hot pressed and cold pressed inserts and will not adversely affect the strength properties of the inserts.

SUMMARY OF THE INVENTION

The present invention provides a tool and a method of treating a tool for material removal. The tool is produced by a method that includes texturing at least one region of a surface of the tool so that the surface roughness of the region is greater than the surface roughness of untextured surfaces of the tool and wherein the textured region is spaced away from a cutting edge of the tool. The textured region may be used, for example, to improve the retention capability of the tool in a tool holder. Preferably, the textured region has an arithmetic average surface roughness, $R_a$, of greater than 30 $\mu$in. The tool may, for example, be a cutting tool insert or a chip breaker.

The texturing treatment of the present invention results in an increase in the friction resistance of the tool, as measured by a "push block" test described below, to an amount greater than 5 in-lb. This represents the maximum friction resistance measured by the present inventors for a conventional ground ceramic cutting tool insert having generally planar surfaces not treated by the method of the present invention.

The present invention also is directed to a method of removing material from an article by machining the article with a tool, wherein the tool is provided by a method comprising texturing at least one region of at least one surface of the tool so that the textured region has a surface roughness that is greater than the surface roughness of untextured surfaces of the tool. The textured region is spaced away from a cutting edge of the tool. Preferably, the textured region has an $R_a$ of greater than 30 $\mu$in and the tool has a friction resistance of greater than 5 in-lbs.

The textured region may be produced by any of a variety of methods. A preferred method includes laser beam impacting the region. The textured region, however, may also be formed by other techniques including chemical and/or mechanical techniques such as grinding and sandblasting, molding, chemical etching, photolithography, and reactive ion etching. Other techniques will be apparent to those of ordinary skill upon considering the present description of the invention. One or more of these techniques are employed in the present invention to texture the treated region(s) of the article, thereby resulting in a surface roughness of the textured region(s) that is greater than the surface roughness of untextured surfaces of the tool. The textured region may be used to improve the retention of the tool in a tool holder. Preferably, the surface roughness of the textured region is greater than 30 $\mu$in. The same texturing process also preferably increases friction resistance to greater than 5 in-lbs. The tool of the present invention may take the form of any tool with a cutting edge and at least one surface having at least one textured region that may be positioned and adapted to provide improved retention when secured to a toolholder. In such tools, the textured region is spaced away from the cutting edge. Such tools may include, for example, material removal tools such as a ceramic cutting tool insert that may be incorporated into a cutting tool system.

The present invention is also directed to a cutting tool system and a method of preparing the same, wherein the system includes a tool holder and a cutting tool insert having at least one surface having a textured region with $R_a$ that is greater than 30 $\mu$in (and preferably at least 63 $\mu$in) and friction resistance greater than 5 in-lbs, and wherein the cutting insert is selectively securable to the tool holder. A cutting tool insert constructed according to the present invention can be used with standard prior art cutting insert clamps and tool holders without modifying the cutting tool, yet the amount of force required to dislodge the cutting tool insert is greater than that of a cutting tool insert that has not undergone the texturing process of the present invention. It is believed the increased surface roughness brought about by the texturing treatment of the present invention results in greater friction resistance between the cutting tool insert and the cutting insert clamp. The cutting insert clamp is composed of a material that is softer than the material comprising the face of the insert in contact with the clamp. After the cutting insert clamp is tightened onto the textured region of a cutting insert constructed according to the present invention, the clamp surface in contact with the textured region deforms such that displacement of the cutting tool insert out of the tool holder pocket and relative to the clamp can occur only after the clamp surface is sheared and plastically deforms.

BRIEF DESCRIPTION OF THE DRAWINGS

The advantages of the present invention may be better understood by reference to the drawings in which.

DETAILED DESCRIPTION OF THE INVENTION

The present invention provides a tool with at least one cutting edge and a method of treating a tool with at least one cutting edge. The tool is produced by a method that includes texturing at least a region of a surface of the tool, wherein the region is spaced away from the cutting edge of the tool, so that the surface roughness of the region is greater than the surfaces roughness of other, relatively untextured surface(s) of the tool. The textured region is used to improve the retention capability of the tool in a tool holder. Preferably, the textured region has a $R_a$ greater than 30 μin. $R_a$ is a measured value of surface roughness known to those of ordinary skill in the art. See, e.g., ASM Handbook (9th ed.), Volume 16 Machining, p. 21. The textured region is spaced away from the cutting edge of the tool by a sufficient distance such that the region does not interfere with the cutting action of the tool. In other words, for example, the textured region is not in a position that will ordinarily contact a chip as it is being formed during a chip machining operation.

The texturing treatment of the present invention results in increasing the "friction resistance" of the tool. The friction resistance is a value determined by the "push block" test described herein. The friction resistance value for a tool of the present invention may be compared with, for example, the maximum friction resistance value of 5 in-lb measured by the present inventors for a conventional ceramic cutting tool insert having generally planar surfaces not treated by the method of the present invention.

The material removal tool of the present invention may take many forms including, for example, a cutting tool insert or a chip breaker that may be incorporated into a cutting tool system. In one preferred embodiment of the present invention, the tool consists of a ceramic cutting tool insert for use in machining metals by chip formation. In particular, the cutting tool described herein is especially advantageous for use in a turning process. The present invention is also directed to cutting tool systems and a method of preparing the same.

Figure 1:
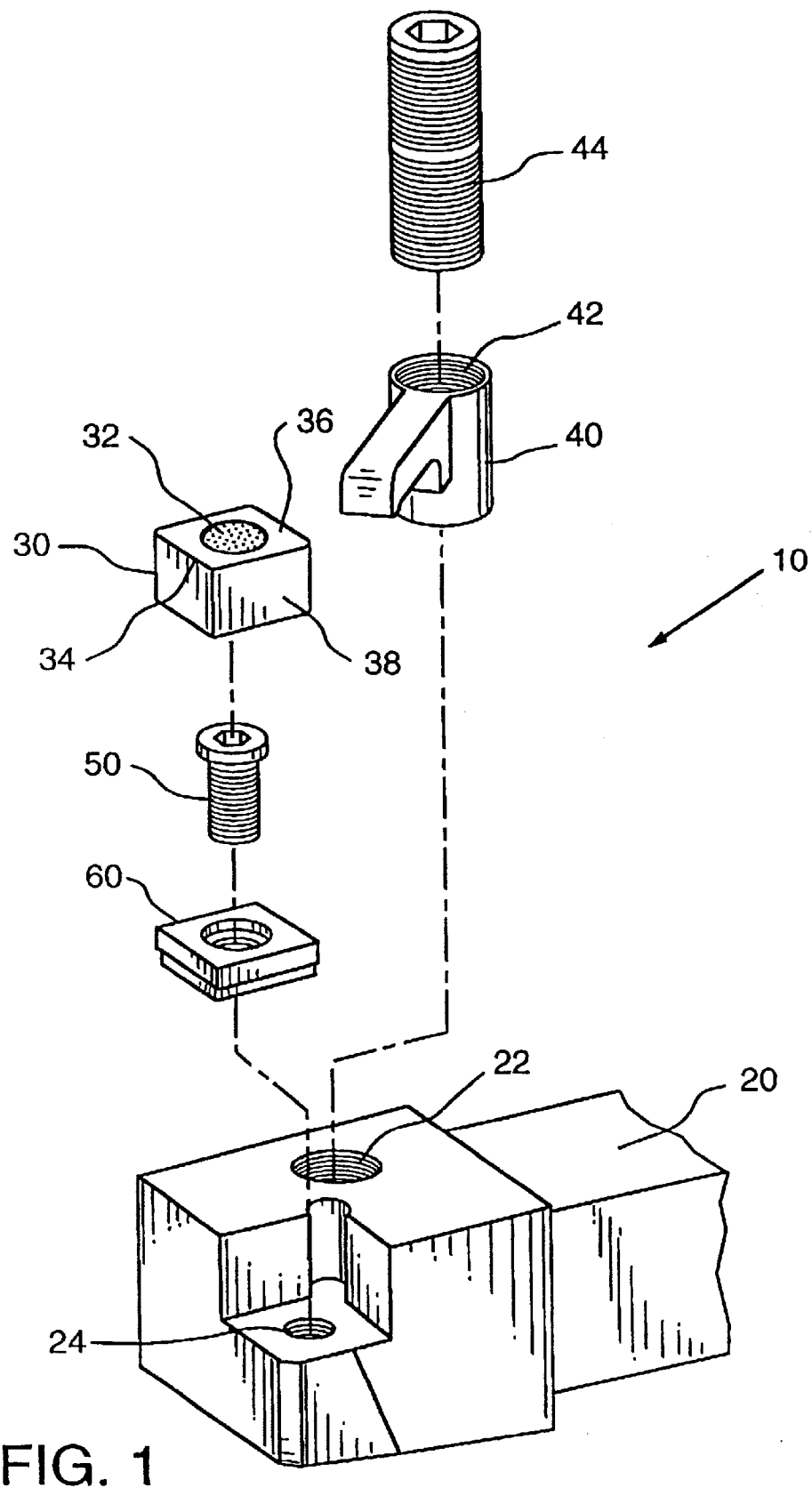
FIG. 1 is a perspective view of an embodiment of a ceramic cutting tool system constructed according to the present invention.

The cutting tool system of the present invention can best understood by reference to FIG. 1, which shows a cutting tool system 10 of the present invention that comprises a tool holder 20 and a ceramic cutting tool insert 30. The cutting tool insert 30 may be made by, for example, hot or cold pressing, and is selectively securable to the tool holder 20. The cutting tool insert 30 may be constructed from any of a variety of materials such as, for example, carbide (ground or unground), cermet (carbide/ceramic), cubic boron nitride, ceramic, and polycrystalline diamond, among others. The cutting tool insert 30 may also include a coating. The coating, if used, may comprise one or more layers of material that may be deposited on the cutting tool insert 30 by any of a variety of known methods. Typical coating materials include TiC, TiCN, TiN, $Al_2O_3$, HfN, and TiAlN, among others. The maximum typical surface roughness values measured by the inventors for cutting tool inserts made from a variety of materials are reported in Table 1.

TABLE 1

| Material | $R_a$, maximum |
|---|---|
| Carbide Ground | 14 |
| Cermet Ground | 6 |
| Ceramic Ground | 20 |

TABLE 1-continued

| Material | $R_a$, maximum |
|---|---|
| Coated Carbide Ground | 34 |
| Carbide Ground | 20 |
| PCD Ground | 3 |

In the embodiment illustrated in FIG. 1, there is shown an L-shaped clamp 40, comprising a first and second leg, that is constructed of a hard material, such as 4140 steel hardened to 35–39 Rockwell C, but that is softer than the material which makes up the cutting tool insert 30. The L-shaped clamp 40 selectively secures the ceramic cutting insert 30 to the tool holder 20. According to this embodiment, the L-shaped clamp includes an aperture 42 through which a screw 44 is inserted. The screw 44 is inserted through aperture 42 and into a bore 22 that is formed in the tool holder 20. The threaded engagement of the bore 22 and screw 44 permit the L-shaped clamp 40 to be easily secured to and then removed from the tool holder 20.

The cutting tool system illustrated in FIG. 1 also includes a second screw 50 and a shim 60. According to this embodiment, the shim 60 rests atop a second bore 24 that is formed in the tool holder 20. The second screw 50 extends through an aperture that is formed in the shim 60 and into the second bore 24. The shim 60 provides a platform onto which the cutting tool insert 30 is placed.

Figure 2:
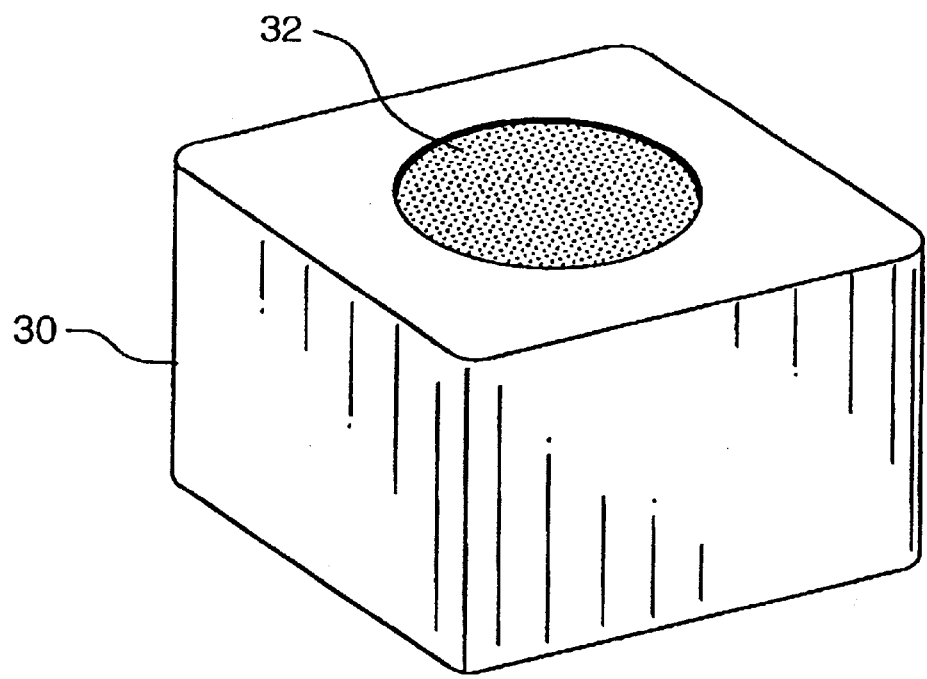
FIG. 2 is a perspective view of an embodiment of a ceramic cutting tool insert constructed according to the present invention.
Figure 3:
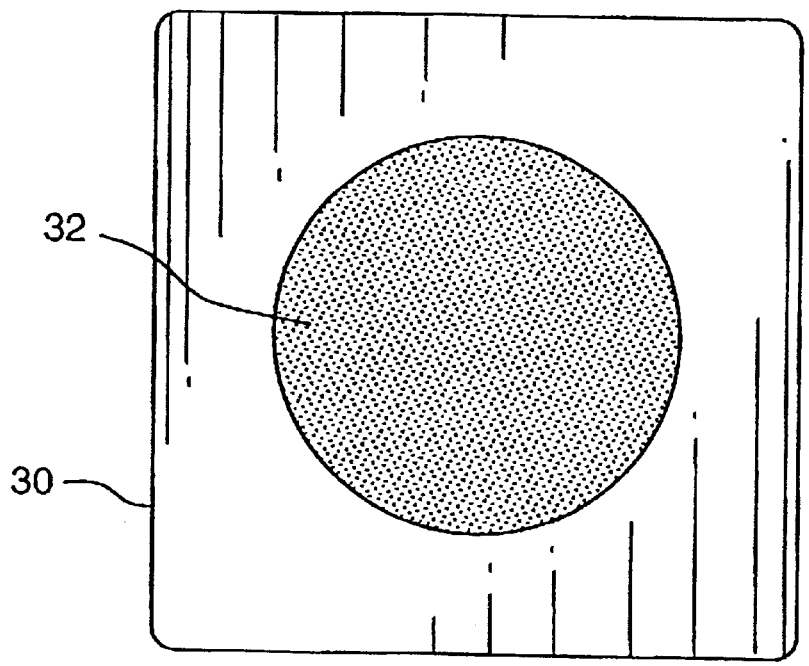
FIG. 3 is a plan view of the ceramic cutting tool insert of FIG. 2.
Figure 4:
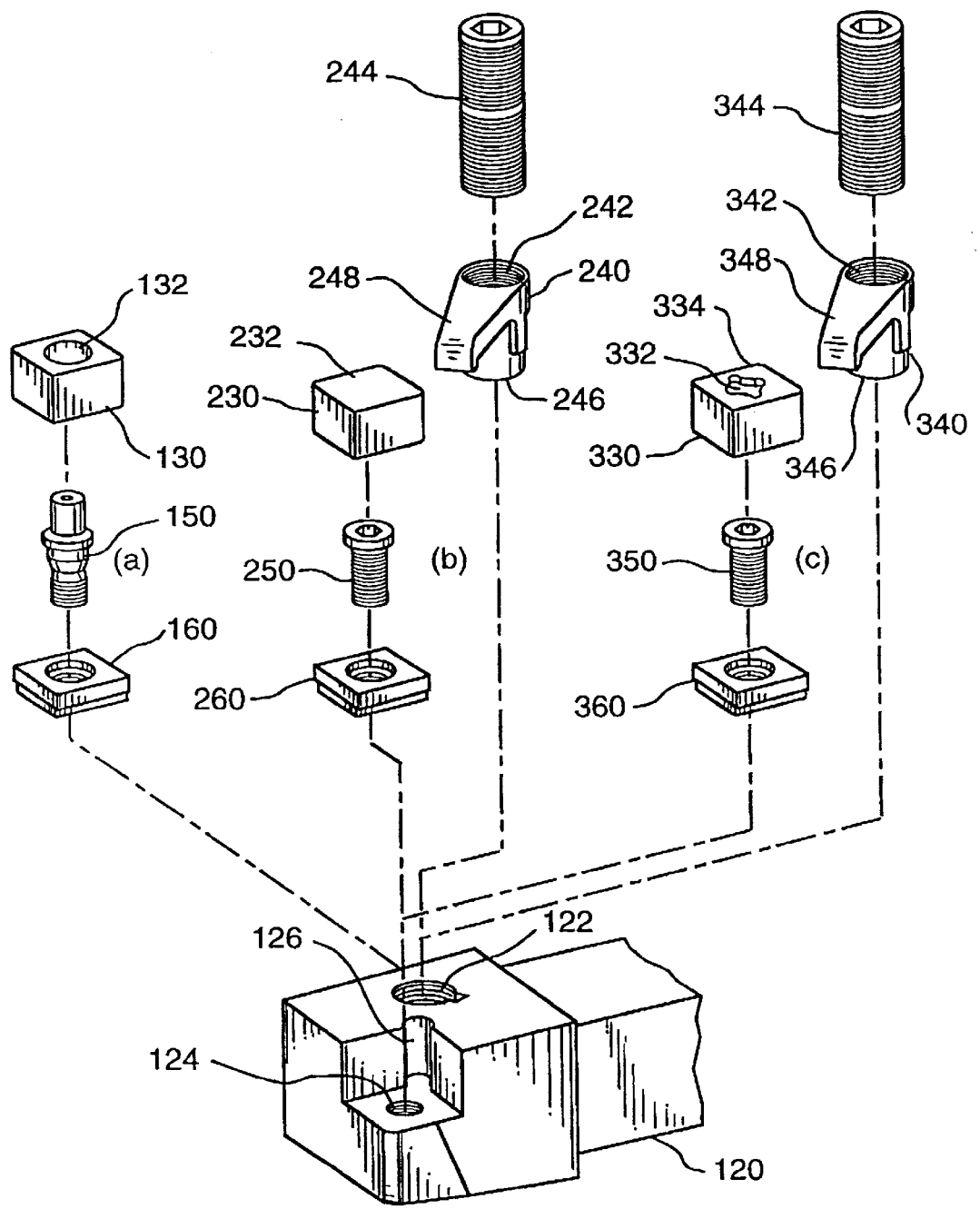
FIGS. 4(a)–(c) are views depicting conventional ceramic cutting tool systems.

Unlike the prior art cutting tool systems (a), (b), and (c) illustrated in FIG. 4, the cutting tool insert 30 of the present invention includes rake face 36 and flank face 38, wherein the rake face 36 includes a textured region 32, which is most easily seen with reference to FIGS. 2 and 3. The textured region 32 occupies a portion of the rake face 36 and is spaced away from the cutting edge 34 of the cutting tool insert 30. Preferably, the textured region 32 is centered on the rake face 36. The textured region 32 may be produced by any of a variety of methods. A preferred method is laser beam impacting, however, the textured region may also be produced by other techniques such as, for example, by grinding and sandblasting, molding, chemical etching, photolithography, and reactive ion etching. If the cutting tool insert 30 is coated, as described above, the coating should be applied so as to not significantly affect the surface roughness of the textured region 32. As is also apparent, the textured region 32 is provided in an area where the L-shaped clamp 40 contacts the cutting tool insert 30.

The cutting tool system of the present invention may also include a chip breaker (not shown) as is well known in the art. This chip breaker, when included, is generally secured to the L-shaped clamp 40 between one leg of the L-shaped clamp 40 and the rake face 36 of the cutting tool insert 30. In one embodiment, the chip breaker may be formed of a material that is softer than the material comprising the textured region 32 of the cutting tool insert 30, wherein the chip breaker contacts the textured region 32 when the L-shaped clamp 40 is secured to the tool holder 20. In another embodiment, the chip breaker may be formed of any material, and another article made of a material that is softer than the material comprising the textured region 32, such as, for example, a steel plate, is disposed between the chip breaker and the cutting tool insert 30. In this embodiment, the bottom of the plate contacts the textured region 32 when the L-shaped clamp 40 is secured to the tool holder 20. Also, the chip breaker may include a textured region on the bottom surface thereof so that the top of the plate contacts the textured region of the plate, thereby improving the retention of the plate and the cutting tool insert 30.

The textured region 32 may be formed in any of a variety of different patterns such as, for example, parallel lines, spirals, concentric or overlapping circles, and/or cross-hatching, among others. Further, when the cutting tool insert 30 is a negative rake insert, wherein multiple cutting edges 34 on the top and bottom are used, a textured region 32 may be formed on each rake face 36 of the cutting tool 30. In this embodiment, the top of screw 50 may contact a textured region 32, thereby further enhancing the retention of the cutting tool insert 30 in the tool holder 20. Generally, the elevation of the textured region(s) 32 should be equal to or slightly depressed from the adjacent, non-textured, regions of the surface. On the other hand, when the cutting tool insert 30 is a positive rake insert, wherein only a cutting edge 34 on the top surface (rake face 36) is used, the elevation of the textured region 32 is not so limited and, in fact, may be elevated from the adjacent, non-textured, regions of the surface.

Figure 5:
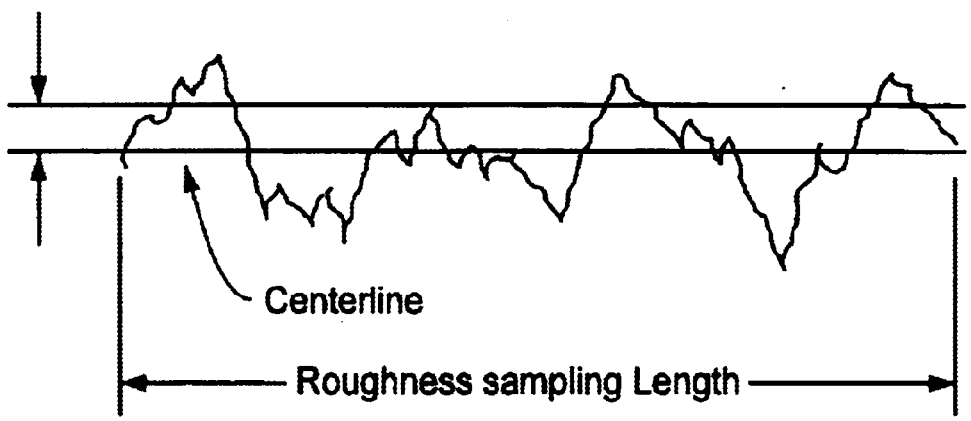
FIG. 5 illustrates the designation of surface roughness in terms of $R_a$.

The textured region 32 has an increased surface roughness relative to other non-textured regions of the cutting tool insert 30. To illustrate the effect of surface texturing on the ability of the L-shaped clamp 40 to retain the cutting tool insert 30 within the tool holder 20, several ceramic cutting insert samples (grade GSN, silicon nitride based inserts manufactured by Greenleaf Corporation, Saegertown, Pennsylvania) were textured to varying degrees of surface roughness, as measured by the arithmetic average surface roughness, $R_a$. Those skilled in the art will recognize that FIG. 5 illustrates the method by which $R_a$ is calculated and will understand that $R_a$ typically is measured using readily commercially available testing equipment. The surface roughness, $R_a$, was measured with a Mitutoyo Surface Testing Machine, Model Surftest 211.

In the embodiments tested, the textured region 32 was produced by laser beam impacting with a 400 watt Nd YAG pulsed energy laser mounted on a CNC guided worktable. The laser was modified by using a curved mirror positioned to concentrate the beam energy to vaporize the ceramic material at the surface only to the desired depth. Laser modifications of this type can be readily accomplished by those skilled in the laser art and the time to form the textured region varies according to the size and pattern of the textured region to be produced, although most patterns can be produced in approximately 30 seconds. Those skilled in the art will also appreciate that laser beam impacting is only one of many methods by which a surface could be textured in accordance with the present invention.

Figure 6:
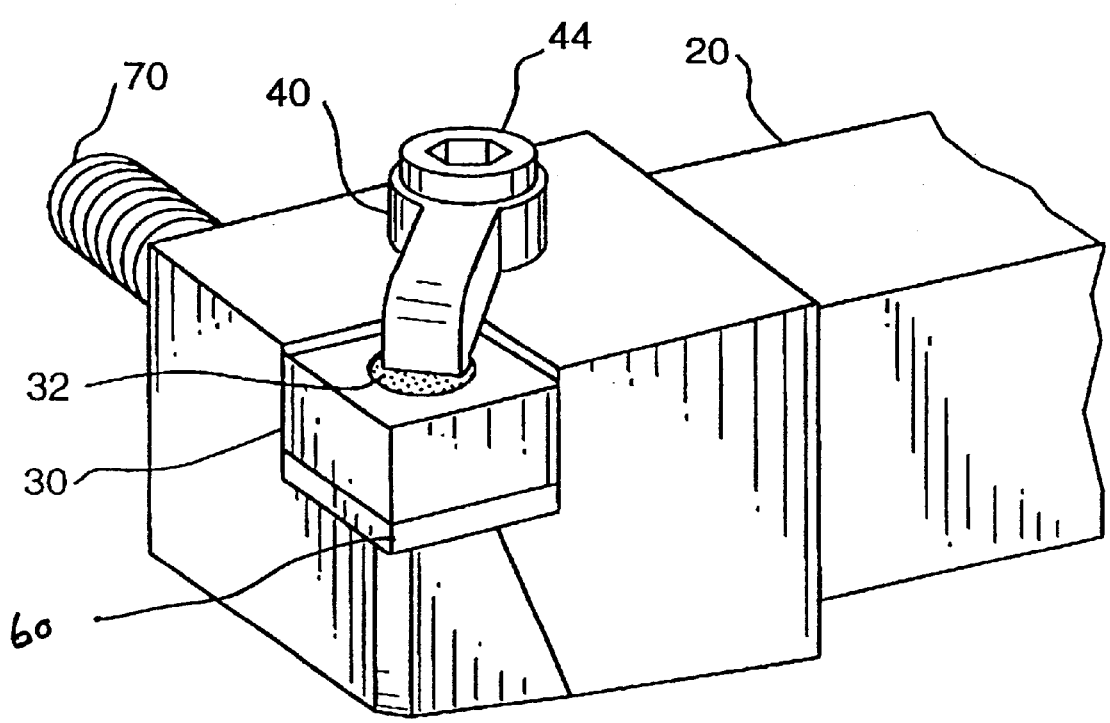
FIG. 6 illustrates the push block test setup referenced in the present description of the invention.

To measure the increase in friction resistance, samples were subjected to a "push block" test developed by the inventors and which was conducted using the apparatus of FIG. 6. In this test, a cutting tool insert 30 constructed of ground ceramic was placed into a tool holder 20 constructed of 4140 steel, an industry standard, in the normal fashion. The cutting tool insert 30 rested on the surface of a shim 60 of a standard design and composed of cemented tungsten carbide. The L-shaped clamp 40 was installed on the tool holder 20 by inserting screw 44 into bore 22 and was tightened with a torque wrench to 80 in-lbs. A CL-12 clamp composed of 4340 steel, an industry standard, was used for the test results reported below. However, similar results were obtained in tests conducted with other prior art clamps and tool holders. For the push block test, the tool holder 20 was modified to include a bore and a set screw 70 extending therethrough in a direction substantially perpendicular to the axis of the screw 44. The end of the set screw 70 could be advanced into the insert pocket of the tool holder and into contact with the cutting tool insert 30. To measure friction resistance, the set screw 70 was tightened with a torque wrench against the cutting tool insert 30 until the cutting tool insert 30 moved distances of 0.0005" and 0.02" is the direction of the longitudinal axis of screw 70 out of the pocket (after first ensuring that any clamp backlash had been removed). Distances were measured with a standard commercially available dial indicator (Interapid Model 312-B1).

The torque required to move various ceramic cutting inserts installed in the modified tool holder 20 the two distances is reported in Table 2 below. As is apparent, increasing the roughness of the surface of the cutting tool insert 30 that comes into contact with the L-shaped clamp 20 dramatically increases the measured friction resistance of the cutting tool insert 30.

TABLE 2

| Sample | Pattern of Textured Surface | Surface Roughness, $R_a$ ($\mu$in)* | Friction Resistance (in-lb req'd to move insert 0.0005")** | Friction Resistance (in-lb req'd to move insert 0.020")** |
|---|---|---|---|---|
| Untextured | N/a | 16+ | 4.2 (5 max) | 4.2 (5 max) |
| 1 | Parallel lines | >1,100 | 9.0 | 19.6 |
| 2 | Parallel lines | >1,100 | 9.6 | 21.0 |
| 3 | Parallel lines | >1,100 | 14.6 | 28.4 |
| 4 | Parallel lines | 482 | 14.6 | 43.8 |
| 5 | Circular lines | >1,100 | 14.2 | 35.6 |
| 6 | Spirals | >1,100 | 12.2 | 40.4 |
| 7 | Spirals | 412 | 16.0 | 27.8 |
| 8 | Parallel lines | 67 | 12.8 (11 min) | 13.0 (11 min) |
| 9 | Parallel lines | 30 | 8.2 (8 min) | 8.6 (8 min) |

*Average value of two measurements
**Average value of five measurements
+Typical value These results indicate that any significant surface roughness, irregularity or interruption patterned onto the insert beyond the expected roughness of a standard ground finish for ceramic cutting tool inserts (which have a typical $R_a$ of 16 $\mu$in) increases friction resistance of the cutting tool insert 30. The friction resistance generally increases with increasing surface roughness. The increase in friction resistance is particularly dramatic at an $R_a$ of 30 $\mu$in, at which point the measured friction resistance is about double that of an untreated surface. The increase in friction resistance is even more pronounced at an $R_a$ of 67 µin. This level of surface roughness, which approximates that of a typical surface having undergone a common sawing process such as that described in ASM Handbook (9th ed.), Volume 16, p. 21, is about 200 percent greater than that of an untextured surface. Thus, texturing a region to an $R_a$ of at least around 63 µin is particularly desirable.

Figure 7:
FIG. 7 is a magnified (40x) image of the surface of a cutting tool insert clamp before tightening down onto the textured region of a ceramic cutting tool insert constructed according to the present invention.
Figure 8:
FIG. 8 is a magnified (40x) image of the surface of a cutting tool insert clamp after tightening down onto the textured region of a ceramic cutting tool insert constructed according to the present invention.
Figure 9:
FIG. 9 is a magnified (40x) image of the surface of a cutting tool insert clamp after a ceramic cutting tool insert constructed according to the present invention has been secured to a tool holder by the cutting tool insert clamp and was then forcefully dislodged from the tool holder according to the push block test referenced in the present description of the invention.

Without being bound to any particular theory of operation, FIGS. 7–9 illustrate what the inventors believe may be an explanation for the increased friction resistance of cutting inserts treated according to the present invention. These magnified (40×) images illustrate the surface of the area of the L-shaped clamp 40 that contacts the textured region 32. As is seen in FIG. 7, the clamp surface is relatively smooth prior to engagement with the textured region 32. However, as is seen in FIG. 8, the clamp surface deforms into the surface irregularities of the textured region after the L-shaped clamp 40 has been tightened down on to the textured region 32. This distortion appears to result from the fact that the material making up the textured region 32 (ceramic in this case) is harder than the material of the L-shaped clamp 40. Finally, as is apparent in FIG. 9, it appears that the increased friction resistance may result from the fact that in order to displace the cutting tool insert 30, the clamp surface must be sheared and plastically deformed.

The present invention, therefore, provides an economical way of producing ceramic articles with greater resistance against slipping. In particular, the present invention is especially useful for producing advantageous cutting tool inserts that may be used with a variety of standard tool holders without modifying the cutting tool. Such inserts can be formed by a method comprising at least one of hot pressing and cold pressing. The method of the present invention may also be used to form other useful tools containing a textured region spaced away from a cutting surface. The tool of the present invention may be formed by any commonly used method such as, for example, hot pressing, cold pressing, hot isostatic pressing, and/or sintering

Having thus described particular embodiments of the present invention, those of ordinary skill in the art will recognize that many modifications and variations of the present invention may be implemented without departing from the spirit and scope of the invention as expressed in the appended claims.

What is claimed is:

1. A tool for material removal made by a process comprising consolidating at least one powder, the tool comprising a substrate including a rake face, at least one flank face and a cutting edge at a junction of said rake face and said at least one flank face, said rake face comprising a region having a textured surface, wherein said textured surface is spaced away at all points from said cutting edge, is formed on said rake face subsequent to consolidating the at least one powder, and has a surface roughness that is greater than other surfaces of the substrate.

2. The tool of claim 1, wherein said textured surface is spaced away all points from said cutting edge at a distance such that said textured surface does not interfere with the material removed by the tool.

3. The tool of claim 1, wherein consolidating at least one powder comprises at least one of hot pressing, cold pressing, hot isostatic pressing, and sintering.

4. The tool of claim 1, wherein said textured surface has an arithmetic average surface roughness of at least 30 µin.

5. The tool of claim 1, wherein said textured surface has a friction resistance greater than 5 in-lbs.

6. The tool of claim 1 wherein the tool comprises at least one material selected from the group consisting of carbide, cemented carbide, cermet, cubic boron nitride, polycrystalline diamond, and ceramic.

7. The tool of claim 1 wherein the tool further comprises a coating formed on at least one surface thereof.

8. The tool of claim 7 wherein said coating comprises at least one material selected from TiC, TiCN, TiN, $Al_2O_3$, HfN, and TiAIN.

9. The tool of claim 1, wherein said textured surface has a friction resistance greater than 8 in-lbs.

10. The tool of claim 1, wherein said textured surface has an arithmetic average surface roughness of at least 63 µin.

11. The tool of claim 1, wherein said textured surface is formed by at least one process selected from grinding, sandblasting, chemical etching, photolithography, reactive ion etching, and laser beam impacting.

12. The tool of claim 1, wherein the tool is selected from the group consisting of a cutting tool insert and a chip breaker.

13. The tool of claim 1, wherein the powder is a powdered ceramic material.

14. A method of treating a tool made by a process comprising consolidating at least one powder, the tool including a rake face, at least one flank face and a cutting edge at a junction of said rake face and said at least one flank face, the method comprising, subsequent to consolidating the at least one powder, texturing at least a region of the rake face to provide a textured region having a surface roughness that is greater than the surface roughness of other surfaces of the tool, and wherein the textured region is spaced away at all points from the cutting edge.

15. The method of claim 14, wherein consolidating at least one powder comprises at least one of hot pressing, cold pressing, hot isostatic pressing, and sintering.

16. The method of claim 14, wherein the textured region has an arithmetic average surface roughness of at least 30 µin.

17. The method of claim 14, wherein the textured region has friction resistance greater than 5 in-lbs.

18. The method of claim 14, wherein the tool comprises at least one material selected from carbide, cemented carbide, cermet, cubic boron nitride, polycrystalline diamond, and ceramic.

19. The method of claim 14, further comprising forming a coating on at least one surface of the tool.

20. The method of claim 19 wherein the coating comprises at least one material selected from TiC, TiCN, TiN, $Al_2O_3$, HfN, and TiAIN.

21. The method of claim 14, wherein the textured region has friction resistance greater than 8 in-lbs.

22. The method of claims 14, wherein the textured region has an arithmetic average surface roughness of at least 63 µin.

23. The method of claim 14, wherein texturing at least a region of the rake face comprises treating the region by at least one of grinding, sandblasting, chemical etching, photolithography, reactive ion etching, and laser beam impacting.

24. A method of making a tool with a plurality of surfaces and at least one cutting edge, the method comprising:
providing a substrate including a rake face, at least one flank face and a cutting edge at a junction of the rake face and the at least one flank face, the substrate made by a process comprising consolidating at least one powder;
texturing at least a region of the rake face subsequent to consolidating the at least one powder to provide a textured region, wherein the textured region is spaced away at all points from the cutting edge and has a surface roughness that is greater than other surfaces of the tool that are not textured.

25. The method of claim 24, wherein consolidating at least one powder comprises at least one of hot pressing, cold pressing, hot isostatic pressing, and sintering.

26. The method of claim 24, wherein the textured region has an arithmetic average surface roughness of at least 30 µin.

27. The method of claim 24, wherein the textured region has friction resistance greater than 5 in-lbs.

28. The method of claim 24 wherein the tool comprises at least one material selected from carbide, cemented carbide, cermet, cubic boron nitride, polycrystalline diamond, and ceramic.

29. The method of claim 24, further comprising forming a coating on at least one surface of the tool.

30. The method of claim 29 wherein the coating comprises at least one material selected from TiC, TiCN, TiN, Al$_2$O$_3$, HfN, and TiAlN.

31. The method of claim 24, wherein the textured region has friction resistance greater than 8 in-lbs.

32. The method of claim 24, wherein the textured region has an arithmetic average surface roughness of at least 63 µin.

33. The method of claim 24, wherein texturing at least a region of the rake face comprises at least one of grinding, sandblasting, chemical etching, photolithography, reactive ion etching, and laser beam impacting.

34. The method of claim 24, wherein the powder is a powdered ceramic material.

35. A method of removing material from an article, the method comprising machining the article with a tool comprising a substrate including a rake face, at least one flank face and a cutting edge at a junction of the rake face and the at least one flank face, wherein the tool is provided by a method comprising consolidating at least one powder and subsequently texturing at least a region of the rake face to provide a textured region, wherein the textured region is spaced away at all points from the cutting edge and has a surface roughness that is greater than that of other surfaces of the substrate.

36. The method of claim 35, wherein consolidating at least one powder comprises at least one of hot pressing, cold pressing, hot isostatic pressing, and sintering.

37. The method of claim 35 wherein the textured region has an arithmetic average surface roughness of at least 30 µin.

38. The method of claim 35, wherein the textured region has friction resistance greater than 5 in-lbs.

39. The method of claim 35 wherein the tool comprises at least one material selected from carbide, cemented carbide, cermet, cubic boron nitride, polycrystalline diamond, and ceramic.

40. The method of claim 35, further comprising forming a coating on at least one surface of the tool.

41. The method of claim 40 wherein the coating comprises at least one material selected from TiC, TiCN, TiN, Al$_2$O$_3$, HfN, and TiAlN.

42. The method of claim 35, wherein the textured region has friction resistance greater than 8 in-lbs.

43. The method of claim 35, wherein the textured region has an arithmetic average surface roughness of at least 63 µin.

44. The method of claim 35, wherein texturing at least a region of the rake face comprises treating the region by at least one of grinding, sandblasting, chemical etching, photolithography, reactive ion etching, and laser beam impacting.

45. A cutting tool insert produced by a method comprising consolidating at least one powder by at least one of hot pressing and cold pressing, the insert including a substrate comprising a rake face, at least one flank face and a cutting edge at a junction of said rake face and said at least one flank face, and at least one textured region on said rake face, wherein said textured region is formed by texturing at least a region of said rake face subsequent to consolidating the at least one powder, and wherein said textured region is spaced away at all points from said cutting edge and has a surface roughness that is greater than other surfaces of said substrate.

46. A cutting tool system comprising:
a tool holder; and
a cutting tool insert produced by a method comprising consolidating at least one powder, the cutting tool insert selectively securable to said tool holder, said cutting tool insert comprising a substrate including a rake face, at least one flank face and a cutting edge at a junction of said rake face and said at least one flank face, wherein said rake face includes a textured region formed by texturing a region of said rake face subsequent to consolidating the at least one powder, wherein the textured region has surface roughness that is greater than other surfaces of said substrate and is spaced away at all points from said cutting edge.

47. The cutting tool system of claim 46, wherein consolidating at least one powder comprises at least one of hot pressing, cold pressing, hot isostatic pressing, and sintering.

48. The cutting tool system of claim 46, wherein said textured region has friction resistance greater than 8 in-lbs.

49. The cutting tool system of claim 46, wherein said textured region has an arithmetic average surface roughness of at least 63 µin.

50. The cutting tool system of claim 46, wherein said textured region is produced by a method comprising at least one of grinding, sandblasting, chemical etching, photolithography, reactive ion etching, and laser beam impacting.

51. The cutting tool system of claim 46, further comprising a clamp selectively securing said cutting tool insert to said tool holder.

52. The cutting tool system of claim 46, wherein said textured region is formed in an area wherein said clamp contacts said cutting tool insert and wherein said clamp is composed of a material softer than the material comprising said cutting tool insert such that said clamp undergoes plastic deformation when forcefully pressed against said textured region.

53. The cutting tool system of claim 51 further comprising a plate comprising a top surface and a bottom surface, wherein said plate is comprised of a material that is softer than a material comprising said cutting tool insert, and wherein said bottom surface of said plate contacts said textured region of said cutting tool insert, and a chip breaker comprising a top and bottom surface, wherein said bottom surface includes a textured region with a surface roughness that is greater than the surface roughness of surfaces of the insert that are not textured, and wherein said textured region contacts said top surface of said plate.

54. A cutting tool system comprising:
a tool holder;
a cutting tool insert made by a process comprising consolidating at least one powder by at least one of hot pressing, cold pressing, hot isostatic pressing, and sintering, said cutting tool insert comprising a substrate including a rake face, a flank face and a cutting edge at a junction of said rake face and said at least one flank face, wherein said rake face includes a textured region formed by texturing a region of said rake face subsequent to consolidating the at least one powder, wherein said textured region has surface roughness that is greater than that of other surfaces of said substrate and is spaced away at all points from said cutting edge; and a clamp selectively securing said cutting tool insert to said tool holder, said clamp having a first end and a second end, said first end being removably secured to said tool holder, said second end having a surface selectively contacting said textured region, wherein said surface is comprised of material that is softer than material comprising said cutting tool insert so that as said surface is forcefully pressed onto said textured region said surface plastically deforms into surface irregularities of said textured region.

55. A tool for material removal, the tool comprising a substrate including a rake face, at least one flank face and a cutting edge at a junction of said rake face and said at least one flank face, wherein said rake face comprises a textured region that is spaced away at all points from said cutting edge and wherein said textured region has an arithmetic surface roughness that is greater than other surfaces of said substrate and is no greater than about 1100 $\mu$in.

56. A method of treating a tool comprising a substrate including a rake face, at least one flank face and a cutting edge at a junction of the rake face and the at least one flank face, the method comprising texturing at least a region of the rake face so that the region has an arithmetic average surface roughness that is greater than the surface roughness of other surfaces of the substrate and is no greater than about 1100 $\mu$in, and wherein the textured region is spaced away at all points from the cutting edge.

57. A cutting tool system comprising:
  a tool holder;
  a clamp; and
  a cutting tool insert selectively securable to said tool holder, said cutting tool insert comprising a substrate including a rake face, at least one flank face and a cutting edge at a junction of said rake face and said at least one flank face, wherein said rake face includes a textured region with an arithmetic average surface roughness that is greater than other surfaces of said substrate and is no greater than about 1100 $\mu$in, and wherein said textured region is spaced away at all points from said cutting edge.

* * * * *

UNITED STATES PATENT AND TRADEMARK OFFICE
CERTIFICATE OF CORRECTION

PATENT NO. : 6,712,564 B1
DATED : March 30, 2004
INVENTOR(S) : Hughes et al.

It is certified that error appears in the above-identified patent and that said Letters Patent is hereby corrected as shown below:

Column 5,
Line 10, please delete the word "surfaces" and insert -- surface -- therefor.
Line 13, please delete the word "$R_a$greater" and insert -- $R_a$ greater -- therefor.
Line 13, please delete the word "$R_a$is" and insert -- $R_a$ is -- therefor.
Lines 43-44, please delete the words "can best understood" and insert -- can best be understood -- therefor.

Column 7,
Lin 32, please delete the word "$R_a$is" and insert -- $R_a$ is -- therefor.
Line 33, please delete the word "$R_a$typically" and insert -- $R_a$ typically -- therefor.

Column 8,
Lines 63 and 66, please delete the word "$R_a$of" and insert -- $R_a$ of -- therefor.

Column 9,
Lines 2 and 7, please delete the word "$R_a$of" and insert -- $R_a$ of -- thereof.
Line 39, please delete the word "sintering" and insert -- sintering. -- therefor.
Line 58, please delete the words "all points" and insert -- at all points -- therefor.

Signed and Sealed this

Ninth Day of November, 2004

JON W. DUDAS
*Director of the United States Patent and Trademark Office*